Dec. 29, 1936.    J. HUMBLET    2,066,112
VALVE
Filed Dec. 19, 1932    2 Sheets-Sheet 1
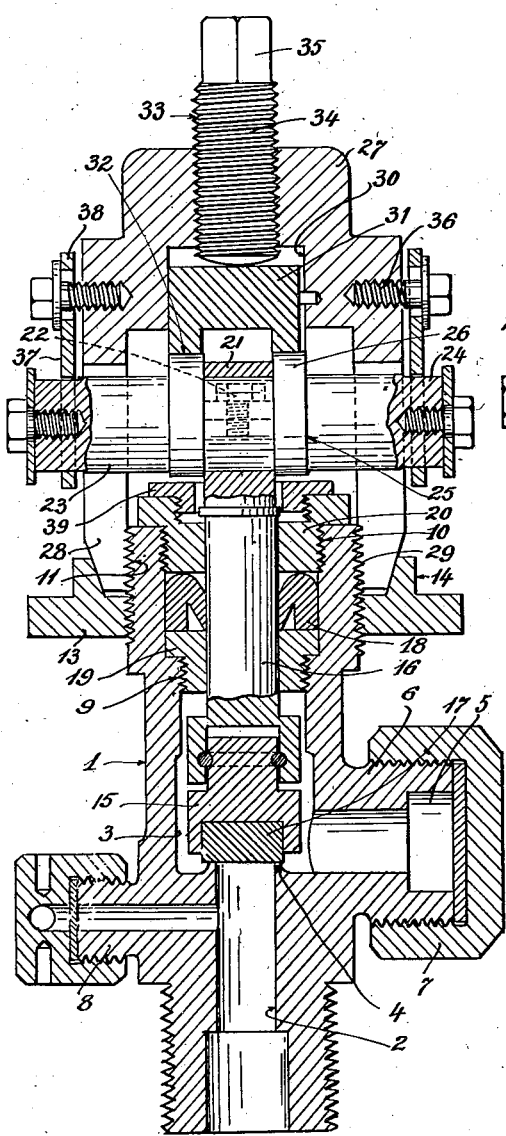
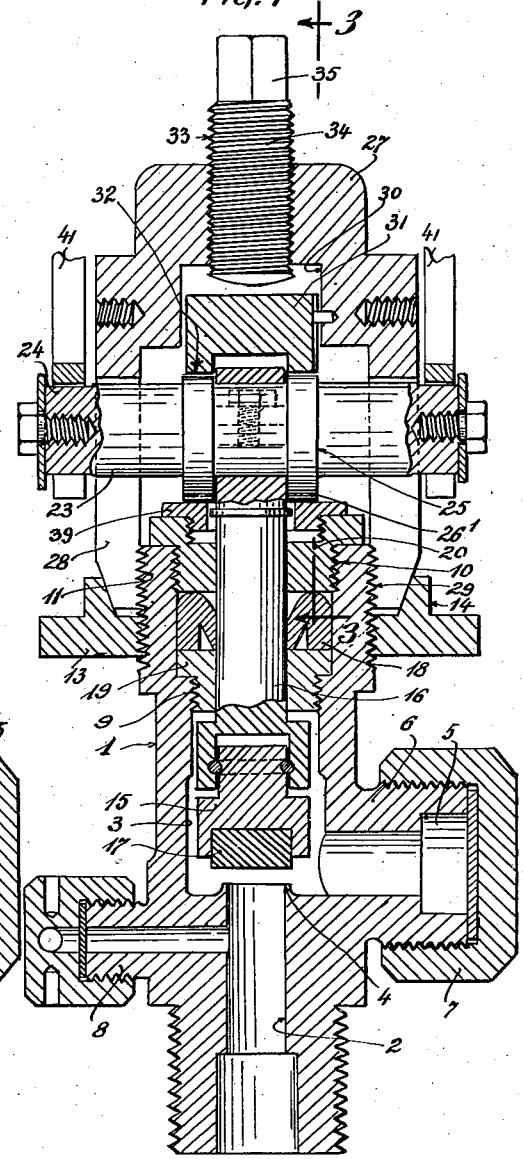
J. Humblet
INVENTOR
By: Marks & Clerk
ATTYS.

Dec. 29, 1936.  J. HUMBLET  2,066,112
VALVE
Filed Dec. 19, 1932  2 Sheets-Sheet 2

INVENTOR.
J. Humblet
BY Marks & Clerk
ATTORNEYS.

Patented Dec. 29, 1936

2,066,112

UNITED STATES PATENT OFFICE 2,066,112

VALVE

Joseph Humblet, Brussels, Belgium

Application December 19, 1932, Serial No. 648,009
In Belgium December 19, 1931

14 Claims. (Cl. 251—40)

The invention concerns valves, and particularly valves of the type in which the opening of the valve is quickly performed, as for example those to be used in connection with fire-extinguishers. With fire extinguishers in which carbon dioxide is used as the medium, it is of importance that the discharge of the carbon dioxide should be as quick and bulky as possible in order to insure rapid extinction.

Quickly opened valves have already been proposed, but although in these known types the opening may be effected for example from a remote point, no provision is made for the closure of the valve.

The invention has for its object to provide a quickly opened valve so arranged that the opening and the closure of the valve may be performed from a remote point as well as through direct manual operation.

Another object of the invention is to provide for a valve as set forth in the preceding paragraph in which the valve is moved from its seat not only under the action of the compressed fluid to be discharged but also in a mechanical manner thus rendering the opening certain.

A further object of the invention is to provide for a valve as set forth in the preceding paragraphs, in which perfect tightness may be obtained whatever may be the state of wear of the valve proper and/or of its actuating members.

The invention consists in a driving arrangement for the valve and for example in combining with a shaft pivoted on the valve rod, one or more cam members normally bearing through a cam portion or portions thereof on a stop and thus maintaining the valve on its seat, such cam portion or portions being at will, as for example from a remote point, spaced from or restored in contact with said stop.

The invention also consists in providing in the path of travel of a cam portion or portions of said cam member or members when the latter are moved, to insure the opening of the valve, a stop so arranged that the valve is mechanically moved from its seat and in this manner may be maintained in any desired opening position.

According to a further feature of the invention, the stop acting as a bearing for the cam members in the closed position of the valve is rendered movable and adjustable, the operation of said stop enabling the valve to be opened and closed without actuating the driving arrangement (for example from a remote point) of the valve, and permitting the tight closure of the valve to be obtained irrespective of the state of wear of the valve, of the driving members or of the stop.

Other features and arrangement of the invention will now be described with more detail in connection with one of its preferred embodiments, given as example and illustrated in the annexed drawings in which:

Fig. 1 is a longitudinal and axial sectional view of a valve in accordance with the invention;

Fig. 4 is a view similar to Fig. 1, with the valve occupying its open position.

Figure 2:
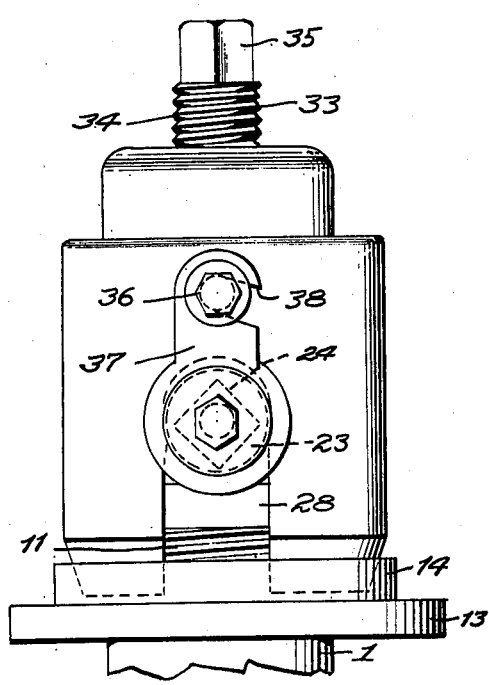
Fig. 2 is a partial side elevation of said valve.

As illustrated, the valve comprises a body 1 having an opening 2 provided with an enlargement as at 3 and with a suitable seat 4 for a valve conveniently shaped in the form of a disc. 5 designates a discharge opening bored through an extension or nozzle 6 externally threaded and to which is adapted to be connected a suitable discharge device, not illustrated, or alternatively, in nonworking period, as during transportation, a closure member 7 is secured as illustrated.

Another nozzle may be provided at 8, adapted to receive a safety device or apparatus.

Further, the bore 2 of the body 1 comprises two threaded portions, 9 and 10 respectively and the upper part of said body comprises another threaded portion 11 on which is screwed an enlargement 13 provided with a flanged portion 14.

A valve 15 conveniently arranged so as to rotate about its rod 16 and and provided with a packing 17, is inserted in the bore 2, the rod 16 extending through a packing 18 pressed between two rings 19 and 20 screwed into the threaded parts 9 and 10 as illustrated.

A collar 21 is former at the upper part of the rod 16, said collar being conveniently formed of two parts secured together as by the screws 22 and in collar 21 is engaged a transverse shaft 23 provided at 24 with operating members for rotating the shaft, such as for example the square portions illustrated.

Figure 3:
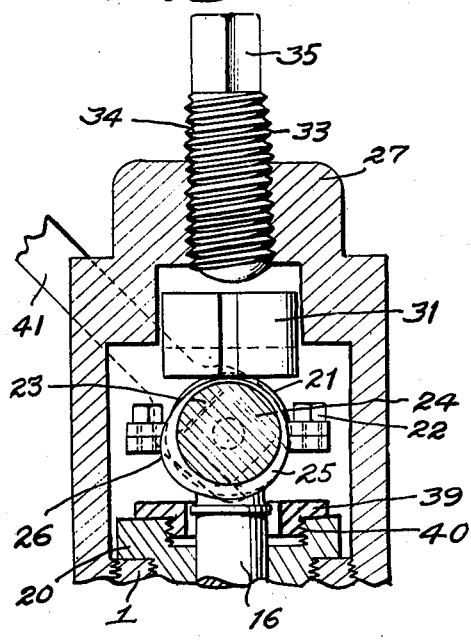
Fig. 3 is a part sectional view along 3—3 of Fig. 4.

The shaft is also provided with cam members 25, including preferably a cam portion 26 and another cam portions 26' the function of which will be explained later on. As these cam portions are designed to act for opposite directions of movement of the member 25, it is not essential to have them separated and they may form a single protrusion as shown in Fig. 3, thus rendering the manufacture less expensive.

Beyond the transverse shaft 23 is provided a bell shaped member, 27, through the openings 28 of which extend the ends of the shaft 23, said member 27 having an internal threaded portion 29 engaging the externally threaded end portion 11 of the body 1.

The member 27 is provided with a housing 30 in which a stop 31 is adapted to slide without rotation, said stop being provided with two bearing surfaces 32 corresponding to the cam shaped elements 25.

Axially of the member 27 is mounted a pressure member 33 conveniently formed as a screw 34 having a square portion 35 on which an operating member such as a wheel, not illustrated, may be engaged for hand actuation.

Laterally to the member 27 and on either side of the latter retaining members, such as the screws 36 are provided, the arrangement being such that if one or more connecting members or levers 37 is or are engaged on one or both of the square portions 24 of the shaft 23 and, by means of a hook or the like 38, engaged behind the head or heads of the screws or stop pins 36, the shaft 23, in the closed position of the valve will be locked for example during transportation or other handling of the apparatus on which the valve is mounted and in the closed position of the valve 15.

The stop 20 is provided with a bearing 39, for example of annular shape, for the cam members 25, such bearing conveniently extending in a threaded portion 40 engaged, as by screwing, in the stop 20 and adjustable in the latter.

Assuming the valve as described mounted on an apparatus containing fluid under pressure, as for example a carbon dioxide extinguisher, the operation is as follows:

*Operation by remote control*

The valve 15 is maintained on its seat by the pressure transmitted through the shaft 23, the cam portions 26 of the cam members 25 bearing on the surfaces 32 of the stop 31 which in turn takes a bearing on the pressure screw 33. The connecting members 37 being removed from the screws 36 and the square extensions 24, operating members such as the levers 41 are engaged on said square extensions, said levers being connected by any known means to a suitable driving member (not shown), and when said driving member is actuated through any suitable means, as for example through the gravity of a weight liberated at the appropriate time, the cam portions 26 are moved relative to the surfaces 32 so as to permit the valve 15 to move away from its seat, the driving action causing the portions 26' of the cam members 25 to bear on the stop 39, thus mechanically raising the said valve, as illustrated by Fig. 4.

By reverse movement of the driving member, the cam portions 26 are restored to their initial positions on the surfaces 32 of the stop 31, mechanically restoring the valve 15 on its seat, and the latter or reverse movement may be controlled from a remote point through appropriate means, not illustrated.

*Operation by manual actuation*

The valve 15 being maintained on its seat in the same conditions as before described, the opening as well as the closure of the valve 15 may be insured by manual actuation, exerted either on the operating levers 41 engaged on the square extensions 24 with the results aforesaid or manual actuation may be imparted to the pressure member 33, provided for example with an operating wheel, the movement of such wheel in the direction corresponding to the unscrewing of the threaded member 34 causing the valve to be opened while the subsequent reverse movement results in the closure of the valve.

Assuming that due to numerous operations the movable members and, or the valve 15 proper wear out to a certain extent, the correct operating conditions and the tightness of the valve can always be restored by suitably screwing the pressure member 33 in the member 27 and thus shortening the distance between the seat of the valve 15 and the bearing on the member 33.

As will be readily understood, modifications may be made in the arrangement illustrated and described within the limits of the invention.

I claim:

1. A valve of the type in which the opening is quickly obtained including a driving arrangement for the valve proper which comprises cam members, a stop, said cam members adapted to bear on said stop to move the valve in one direction and means to move the cam members out of and in contact with the stop.

2. A valve of the type in which the opening is quickly obtained including a valve proper, a valve rod carrying the valve and a driving arrangement for the valve which comprises cam members, a stop, said cam members adapted to bear on said stop to hold the valve in closed position, a pressure member, said stop being movable and under control of the pressure member, means to operate the pressure member and means for operating the cam members, the operation of said pressure member enabling any play to be removed and the valve to be opened and closed irrespective of the actuation of the cam members.

3. A valve of the type in which the opening is quickly obtained including a driving arrangement for the valve proper comprising cam members, a stop, said cam members adapted to bear on said stop whereby the valve is maintained in its closed position, a stop opposite the first named stop, said cam members adapted to bear on the last named stop, and means to operate said cam members whereby upon operation of said means the last named stop and the cam members are brought in engagement with each other and the valve is mechanically opened.

4. A valve of the type in which the opening is quickly obtained comprising a valve, a valve rod, cam members movably connected to said rod, a movable stop and a pressure member controlling the position of said stop, another stop opposite the first named stop, cam portions of the cam members adapted to engage the first named stop and other cam portions of said cam members adapted to engage the second named stop, and means to operate said cam members, whereby upon operation of said means the valve is caused to be mechanically closed and opened.

5. A valve according to claim 4 comprising means adapted for locking the valve in its closed position.

6. A valve according to claim 4 in which the valve rod comprises a collar, and the means to operate the cam members comprises a shaft rotating in said collar, and the cam members are mounted on said shaft, a valve body, said shaft extending through said body, and means on the shaft ends to operate the latter in circular direction.

7. A valve of the type in which the opening is quickly obtained comprising a valve proper, a valve rod carrying said valve proper, a collar on the valve rod, a transverse shaft adapted to rotate in said collar and cam members on said shaft, a valve body, a bell shaped member on the body, a movable stop on which the cam members are adapted to bear said stop located in and sliding relative to said bell shaped member, an adjustable pressure member engaged in the bell shaped member behind said movable stop and means on the pressure member to adjust said stop in the bell shaped member.

8. A valve of the type in which the opening is quickly obtained comprising a valve proper, a valve rod carrying said valve proper, a collar on the valve rod, a transverse shaft adapted to rotate in said collar, cam members on said shaft, a valve body, a stop for the said cam members and said stop engaged in and adjustable relative to said body.

9. A valve according to claim 4 in which the valve rod is provided with a collar, and the means for operating the cam members comprises a shaft rotating within said collar, a valve body, hooked levers adapted to be mounted on the shaft, stop pins on the body and said hooked levers and said stop pins adapted for locking said shaft from movement in circular direction relative to said body.

10. A valve of the type in which the opening is quickly obtained including a driving arrangement for the valve proper comprising cam members, a bearing stop, a cam portion of each of said members adapted to bear on the stop, whereby the valve is maintained in its closed position, another cam portion on each of the said members, another bearing stop for said other cam portions of the members and means to operate said cam members whereby upon operation of said means the last named stop and the said other cam portions are brought in engagement with each other and the valve is mechanically opened.

11. A valve of the type in which the opening is quickly obtained including a driving arrangement for the valve proper comprising cam members, a movable stop and a pressure member controlling the position of said stop, another stop opposite the first named stop, cam portions of the cam members adapted to engage the first named stop and cam portions of said members adapted to engage the second named stop, means to operate the cam members and means to operate the pressure member.

12. A valve of the type in which the opening is quickly obtained including a driving arrangement for the valve proper comprising cam members each having two cam portions thereon, a movable stop and a pressure member controlling the position of said stop, another stop opposite the first named stop, a cam portion of each of the cam members adapted to engage the first named stop and a cam portion of each of said members adapted to engage the second named stop, means to operate said cam members and means to operate the pressure member.

13. A valve of the type in which the opening is quickly obtained comprising a valve proper, and operating means for said valve proper, said operating means including a valve rod, a cam member movably connected to said rod, a movable stop and a pressure member controlling the position of said stop, another stop opposite the first named stop, a cam portion of said cam member adapted to engage the first named stop and another cam portion of said cam member adapted to engage the second named stop, and means to operate the cam member and the pressure member.

14. A valve of the type in which the opening is quickly obtained comprising a valve proper, and operating means for said valve proper, said operating means including a valve rod, a cam member connected to said valve rod, a movable stop providing a bearing for the cam member and a pressure member controlling the position of said stop, another stop providing a bearing for the cam member and opposite the first named stop, and means to actuate the cam member.

JOSEPH HUMBLET.